2 Sheets—Sheet 1.

A. NAGEL & R. KAEMP.
Disintegrating Apparatus for Flour-Mills.

No. 228,669.  Patented June 8, 1880.

Attest,
Erasmus Paul.
Rudolph Weingärtner.

Inventors,
Aug. Nagel & Reinh. Kaemp
per
Atty.

N. PETERS, PHOTO-LITHOGRAPHER, WASHINGTON, D.C.

2 Sheets—Sheet 2.

A. NAGEL & R. KAEMP.
Disintegrating Apparatus for Flour-Mills.

No. 228,669. Patented June 8, 1880.

Attest,
Erasmus Paul
Rudolph Weingärtner

Inventors,
Aug. Nagel & Reinh. Kaemp
per
Atty.

UNITED STATES PATENT OFFICE.

AUGUST NAGEL AND REINHOLD KAEMP, OF HAMBURG, GERMANY.

DISINTEGRATING APPARATUS FOR FLOUR-MILLS.

SPECIFICATION forming part of Letters Patent No. 228,669, dated June 8, 1880.

Application filed September 20, 1878. Patented in France October 16, 1877, in Belgium October 18, 1877, in England November 5, 1877, in Italy December 31, 1877, and in Austria March 6, 1878.

*To all whom it may concern:*

Be it known that we, AUGUST NAGEL and REINHOLD KAEMP, both of Hamburg, in the German Empire, have invented a Dismembrator for Flour-Mills, of which the following is a specification.

This invention relates to an improved disintegrating-machine, which we have called "dismembrator."

The object of the same is, especially, to separate from each other the particles of the ground or crushed products delivered by roller-mills; but it may also be used for the comminution of grain, of the partly-reduced products obtained from millstones, and of various other materials which are sufficiently brittle and fragile for being operated upon by the machine.

Figure 2:
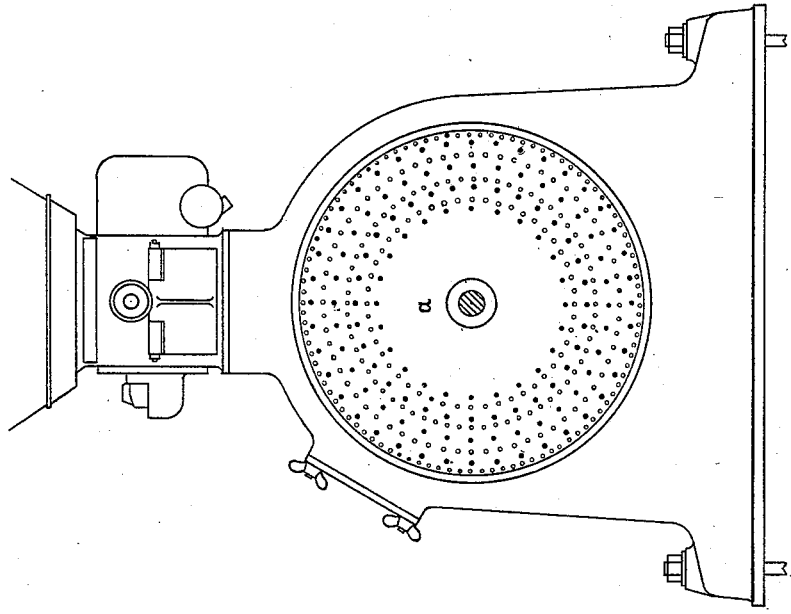
Figure 1:
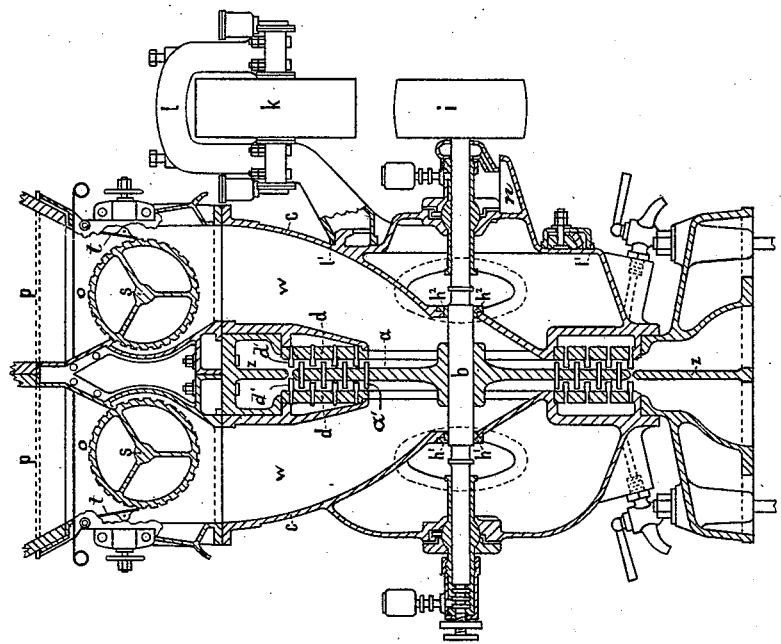
Figure 4:
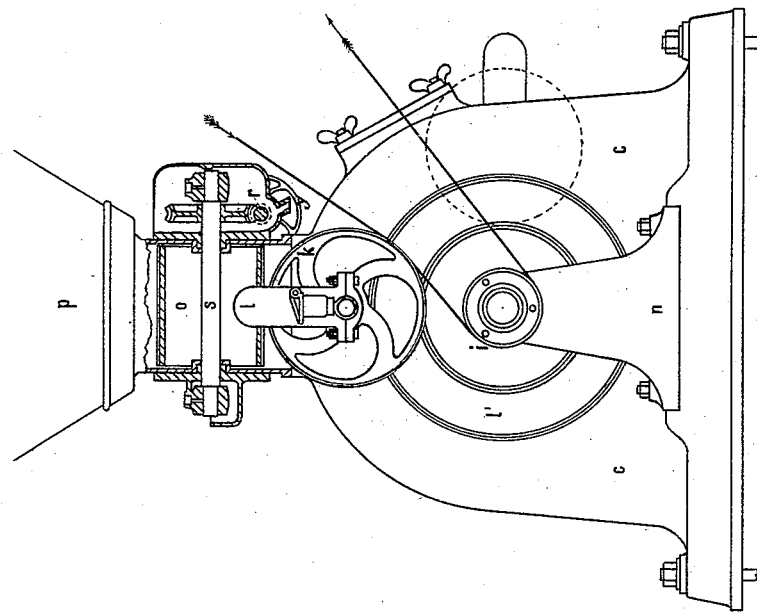
Figure 3:
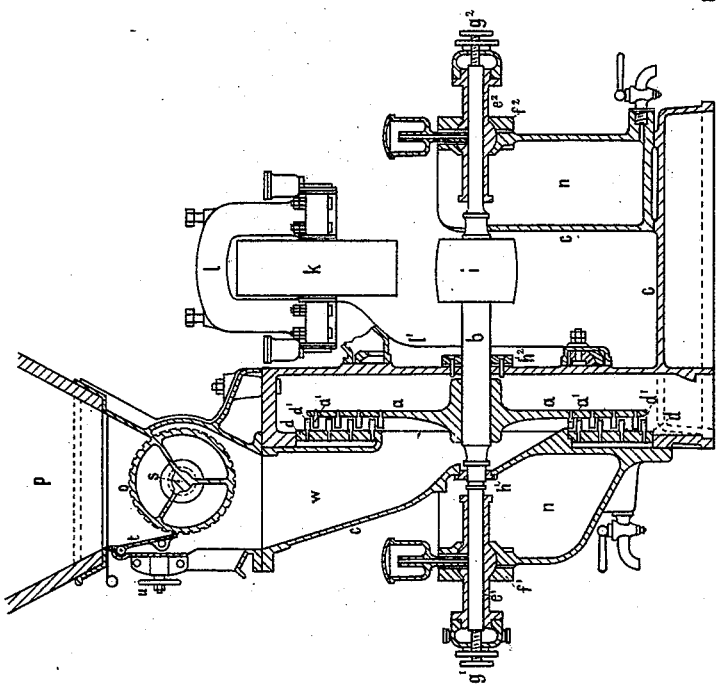

The said machine is represented on the accompanying two sheets of drawings. Figure 1 is a vertical section of the same, and Fig. 2 a front elevation with part of casing and one of the fixed disks removed, so as to show the rotating disk and the sections of pegs of the removed fixed disk. Figs. 3 and 4 show a modification of the machine in vertical section and in sectional front elevation, respectively.

In Fig. 1, $a$ is a disk, having concentric rows of short studs or pegs $a'$ on both sides, and rotating by means of its shaft $b$ between the two annular disks $d$ $d$. The latter are fixed to the inside of the casing $c$, and are provided with concentric rows of pegs $d'$ on the side opposite to the rotating disk. The studs $a'$ on either side of the rotating disk $a$ are arranged to pass between and close to the studs $d'$ of the fixed disks $d$ in a similar manner and for an analogous purpose as in the well-known disintegrating-mills. The bushes or brasses in which the shaft $b$ revolves are made very long, so as to present a large bearing-surface and to prevent heating, and they are turned spherical in the middle, where they are supported by a corresponding plumber-block or part of the framing, thereby insuring to them a perfectly true self-adjustment to the shaft. The brasses are moreover provided at one or at both ends with suitable arrangements for adjusting the shaft lengthwise. (See also Fig. 3.) The cavities $n$ $n$ in the frame of the machine are utilized as receptacles for collecting the oil dripping from the bearings of shaft $b$.

For the purpose of causing the driving-strap to bear on a larger part of the circumference of the driving-pulley, and of stretching the strap properly, a tension or tightening pulley, $k$, presses on it from the outside. The axle of the pulley $k$ revolves in bearings forming part of a bow-shaped bracket, $l$, which is attached to or cast together with a ring, $l'$, screwed to the casing of the machine. This arrangement is shown more clearly in Figs. 3 and 4. The heads of the bolts by which the ring $l'$ is secured slide in a dovetailed or otherwise suitably-shaped circular groove, or along a dovetail-ledge on the outside of the casing, so that the tension-pulley $k$ may be shifted around in a circle and secured in any desired position. By preference the said groove or ledge is made concentric with the shaft $b$.

The machine is provided with two feeding apparatuses, each consisting of a hopper, $p$, communicating with a grain-conveying tube, a feed-roller, $o$, having grain-carrying recesses, and mounted to revolve in the throat of said conveying-tube, and an adjustable valve, $t$, serving to regulate the rate of feed. The roller $o$ is driven by a worm-wheel gearing, $r$, as represented in Fig. 4. The substances fed in by these apparatuses pass along the channels $w$ toward the center of the rotating disk $a$, and are thence projected radially outward by the centrifugal action of this disk, so as to be operated upon by the series of pegs $a'$ and $d'$.

The disk $a$ is encircled by a partition-wall, $z$, whereby the material admitted by one feeding apparatus is kept separate from that supplied by the other one, so that two different materials may be treated at the same time without becoming mixed. If it should be preferred, however, the machine may be provided with a single feeding apparatus only, and in this case the partition-wall $z$ may be dispensed with.

The casing of the machine is made tight around the shaft $b$ by the stuffing-boxes $h'$ and $h^2$, so that as long as there is any material in the hopper and the outlet of the machine is connected with a proper receptacle, or with the pipe leading to a dressing-machine, no air can enter into the casing c from the outside or circulate within the same. In consequence of this arrangement the required driving-power is reduced, and no dust of the material to be comminuted can escape.

In the modified apparatus represented by Figs. 3 and 4 there is but one fixed disk, d. The rotating disk a is consequently provided with pegs on one side only. For the rest the arrangement is substantially the same as the one represented by Figs. 1 and 2.

As in the described dismembrating-machine there is but a single rotating disk keyed on the middle of a shaft which has its bearings at either end, greater accuracy of motion is attained than by the two rotating disks ordinarily employed in disintegrating-mills. The first arrangement has, moreover, the advantage that the rarefaction of air caused between the rotating disk and the fixed disks is equal on both sides of the former. Consequently, there is no pressure lengthwise on the shaft b, as is the case in disintegrating-machines with two rotating disks, or in the second arrangement of dismembrator described. Besides, as in the first arrangement the performance of the machine is doubled, as compared with a disintegrator of ordinary design, without materially increasing the friction of the shaft in its bearings, the efficiency of the machine is increased.

We claim as our invention—

1. The combination, with a closed casing containing one or two fixed disks, as d, and a rotating disk, as a, the bearings of whose shaft are packed, of one or two feeding apparatuses consisting of a conducting-tube, in the throat of which a feed-roller having carrying-recesses is mounted, the said parts being constructed and arranged so as to exclude the air while permitting a constant feed, substantially as described.

2. The combination of a closed casing, c, containing one or two fixed disks, d, and a rotating disk, a, the shaft of which latter is packed by stuffing-boxes, as $h'$ $h^2$, said casing being provided with one or two feeding apparatuses consisting of a hopper, p, feed-roller o, and valve t, the said parts being constructed and arranged so as to exclude the air while permitting a constant feed, substantially as shown and described.

3. The combination, with the casing c, the shaft b, and its pulley i, of the belt-tightening pulley k, mounted in bearings, the supporting-bracket of which travels in a circular groove, $l'$, whereby the pulley k is capable of adjustment in a circular arc, substantially as described.

In testimony whereof we have signed our names to this specification in the presence of two subscribing witnesses.

AUGUST NAGEL.
REINHOLD KAEMP.

Witnesses:
LOUIS FANTREN,
WILH. MEISTER.